(12) United States Patent
Gane et al.

(10) Patent No.: US 9,644,101 B2
(45) Date of Patent: May 9, 2017

(54) INORGANIC PIGMENT CONTAINING CALCIUM CARBONATE, AQUEOUS SUSPENSION CONTAINING SAME, AND USES THEREOF

(75) Inventors: Patrick Gane, Rothrist (CH); Matthias Buri, Rothrist (CH); Rene Vinzenz Blum, St. Urban (CH)

(73) Assignee: Omya International AG, Oftringen (CH)

( * ) Notice: Subject to any disclaimer, the term of this patent is extended or adjusted under 35 U.S.C. 154(b) by 1402 days.

(21) Appl. No.: 10/547,641

(22) PCT Filed: Mar. 17, 2004

(86) PCT No.: PCT/IB2004/000773
§ 371 (c)(1),
(2), (4) Date: Aug. 31, 2005

(87) PCT Pub. No.: WO2004/083316
PCT Pub. Date: Sep. 30, 2004

(65) Prior Publication Data
US 2006/0162884 A1 Jul. 27, 2006

(30) Foreign Application Priority Data
Mar. 18, 2003 (FR) ...................................... 03 03281

(51) Int. Cl.
*C09C 1/02* (2006.01)
*C04B 14/00* (2006.01)
(Continued)

(52) U.S. Cl.
CPC .............. *C09C 1/022* (2013.01); *C09C 1/021* (2013.01); *D21H 17/675* (2013.01);
(Continued)

(58) Field of Classification Search
CPC ... D21H 17/69; D21H 17/675; C01P 2004/03; C01P 2004/61; C01P 2004/62;
(Continued)

(56) References Cited

U.S. PATENT DOCUMENTS 2,263,656 A  11/1941 Stutz
3,133,824 A * 5/1964 Podschus ...................... 106/464
(Continued)

FOREIGN PATENT DOCUMENTS

CL    3103-1999     11/2000
CN    1335874 A     8/2001
(Continued)

*Primary Examiner* — Shuangyi Abu Ali
(74) *Attorney, Agent, or Firm* — Amster, Rothstein & Ebenstein LLP

(57) ABSTRACT

The present invention concerns the technical sector of mineral pigments containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminum silicate and/or at least one synthetic silica and/or at least one calcium silicate and/or at least one silicate of a monovalent salt such as sodium silicate and/or potassium silicate and/or lithium silicate, and/or at least one aluminum hydroxide and/or at least one sodium and/or potassium aluminate, containing less than 0.1% by weight silicate of a monovalent salt such as sodium, potassium or lithium silicate or mixtures thereof, relative to the dry weight of calcium carbonate, having a pH greater than 7.5 measured at 20° C., and their uses in papermaking applications such as mass filling and/or the coating of paper and more particularly of printing paper, in particular for offset printing, or digital printing such as inkjet and/or laser printing.

20 Claims, 14 Drawing Sheets

(51) Int. Cl.
*C04B 14/04* (2006.01)
*D21H 17/67* (2006.01)
*B41M 5/52* (2006.01)

(52) U.S. Cl.
CPC ........ *B41M 5/5218* (2013.01); *C01P 2004/03* (2013.01); *C01P 2004/61* (2013.01); *C01P 2004/62* (2013.01); *C01P 2006/12* (2013.01); *C01P 2006/60* (2013.01)

(58) Field of Classification Search
CPC .. C01P 2006/12; C01P 2006/60; C09C 1/021; C09C 1/022; C09C 1/42; C01F 11/181; C01F 11/182; C01F 11/185
USPC ........................ 106/465, 431, 471; 162/158
See application file for complete search history.

(56) References Cited

U.S. PATENT DOCUMENTS

| | | | | |
|---|---|---|---|---|
| 3,443,890 | A | * | 5/1969 | Myers et al. ................ 423/432 |
| 4,264,372 | A | * | 4/1981 | Graves .................. B82Y 30/00 106/465 |
| 5,007,964 | A | * | 4/1991 | Tsukisaka et al. ............ 106/464 |
| 5,043,017 | A | * | 8/1991 | Passaretti ...................... 106/465 |
| 5,156,719 | A | * | 10/1992 | Passaretti ...................... 162/158 |
| 5,164,006 | A | * | 11/1992 | Chapnerkar ............ C09C 3/063 106/431 |
| 5,531,821 | A | * | 7/1996 | Wu .............................. 106/464 |
| 6,083,317 | A | * | 7/2000 | Snowden ................ C09C 1/024 106/464 |
| 6,136,085 | A | * | 10/2000 | Adams et al. ................ 106/463 |
| 6,666,953 | B1 | * | 12/2003 | Gane et al. ................ 162/181.2 |

FOREIGN PATENT DOCUMENTS

| | | |
|---|---|---|
| EP | 0529308 A1 | 3/1993 |
| JP | 60072963 | 4/1985 |
| JP | 61118287 | 6/1986 |
| JP | 11107189 | 4/1999 |
| WO | 9503241 A1 | 2/1995 |
| WO | 9820079 A1 | 5/1998 |
| WO | 0026305 A1 | 5/2000 |
| WO | 0039222 A1 | 7/2000 |
| WO | WO 01/40576 A1 | 6/2001 |
| WO | 0192422 A1 | 12/2001 |

* cited by examiner

INORGANIC PIGMENT CONTAINING CALCIUM CARBONATE, AQUEOUS SUSPENSION CONTAINING SAME, AND USES THEREOF

This is a U.S. national phase of PCT Application No. PCT/IB2004/000773, filed Mar. 17, 2004 and priority to French Application No. 03/03281, filed Mar. 18, 2003.

The present invention concerns the technical sector of mineral fillers and concerns in particular mineral pigments containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate, used in papermaking applications, such as mass filling and/or paper coating, and more particularly printing paper, in particular for offset printing, and more particularly digital printing such as inkjet and/or laser printing and improvements thereto by appropriate coating and/or mass treatments in order in particular to improve the printability of the coated and/or non-coated papers, and/or the ability of the ink not to go through the paper, commonly referred to in the papermaking field as "ink strike through" as well as the ability of the ink not to be seen on the reverse side of the paper, an ability also normally referred to in the papermaking field as "ink show through" and/or in order to reduce ink featherings during inkjet printing.

The invention also concerns a method of manufacturing a mineral pigment containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate, as well as the mineral pigment obtained by the method.

This mineral pigment according to the invention can possibly be put in aqueous suspension by means of an anionic electrolyte in order to obtain an aqueous anionic suspension of filler containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate.

This anionic aqueous suspension possibly contains one or more anionic electrolytes such as for example one or more dispersing agents.

This mineral pigment according to the invention can possibly be put in aqueous suspension by means of a cationic electrolyte in order to obtain an aqueous cationic suspension of filler containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate.

This mineral pigment according to the invention can possibly be put in aqueous suspension by means of a weakly anionic electrolyte in order to obtain an aqueous weakly anionic suspension of filler containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate.

Finally, the invention concerns the use of the said mineral pigment and/or aqueous suspensions thereof as a mass filler in the manufacture of non-coated paper sheet and/or as base of a coating formulation in operations of paper surface treatment and/or paper coating.

Lastly, the invention concerns the paper base, for digital printing as inkjet printing, containing the said aqueous suspension of mineral pigment containing a pigment formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate.

DETAILED DESCRIPTION

Figure 1:
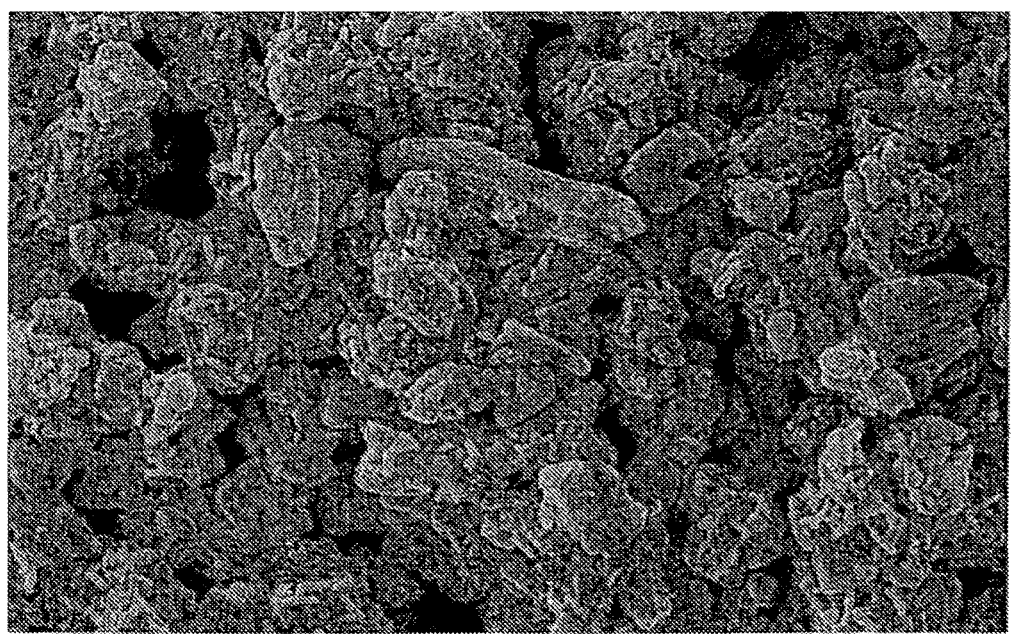
FIG. 1: An image of Test No. 1 pigment obtained by electron microscope of the LEO 435VPi type from LEO Elektronenmikroskopie GmbH.
Figure 2:
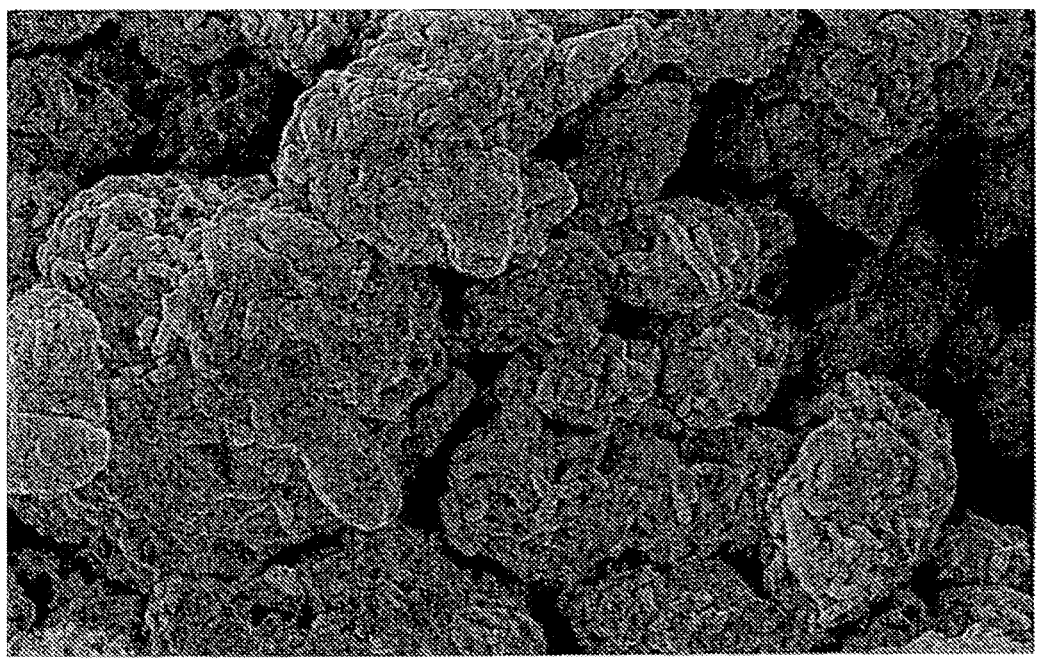
FIG. 2: An image of Test No. 2 pigment obtained by electron microscope of the LEO 435VPi type from LEO Elektronenmikroskopie GmbH.
Figure 3:
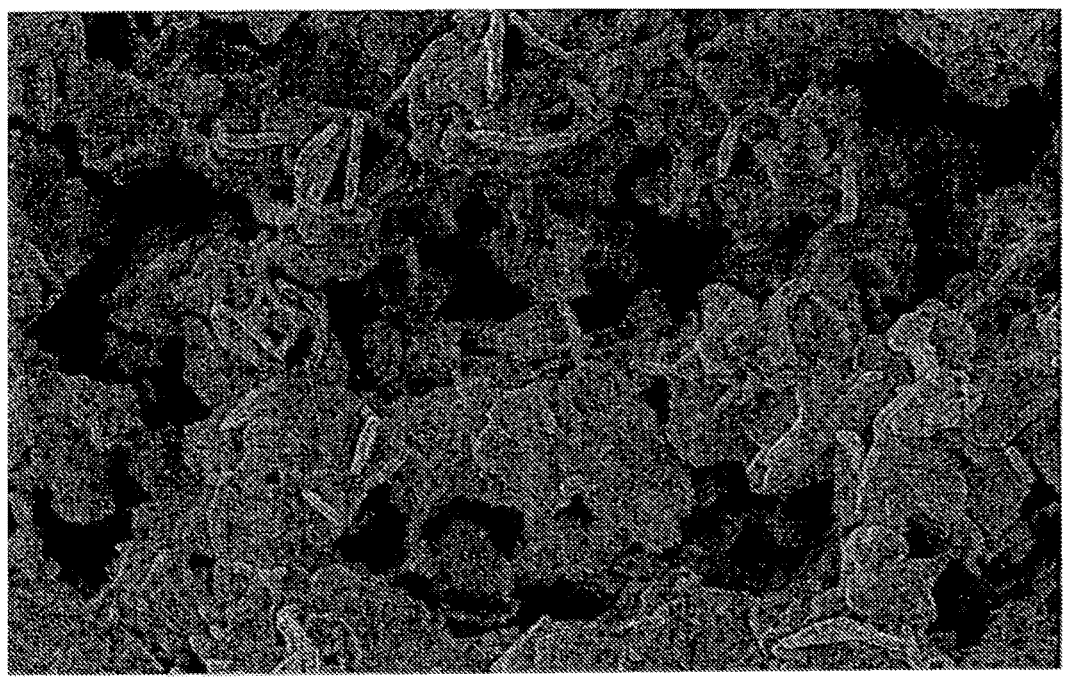
FIG. 3: An image of Test No. 3 pigment obtained by electron microscope of the LEO 435VPi type from LEO Elektronenmikroskopie GmbH.
Figure 4:
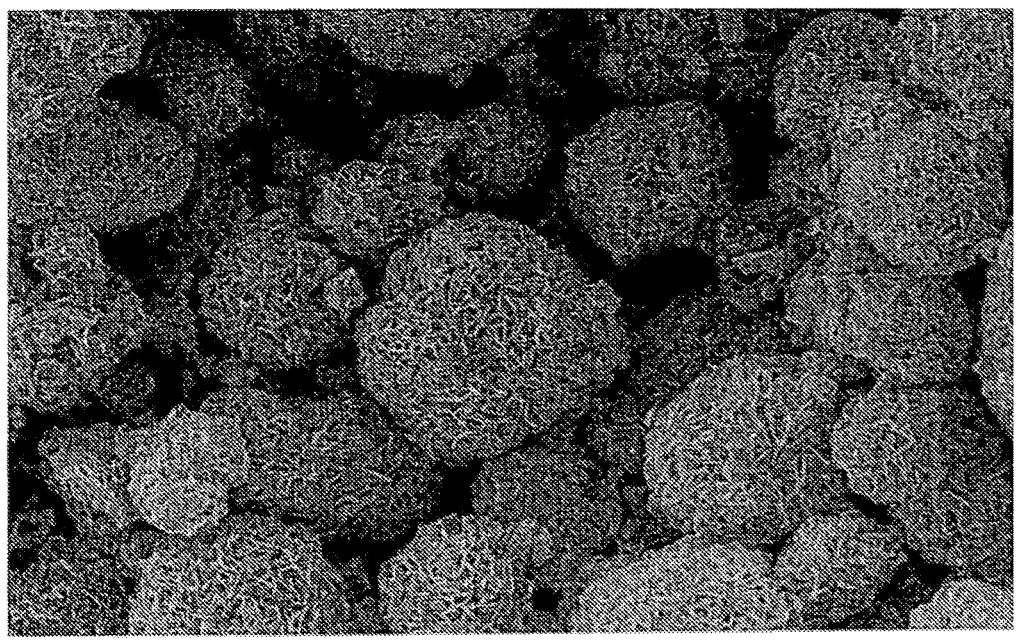
FIG. 4: An image of Test No. 4 pigment obtained by electron microscope of the LEO 435VPi type from LEO Elektronenmikroskopie GmbH.
Figure 5:
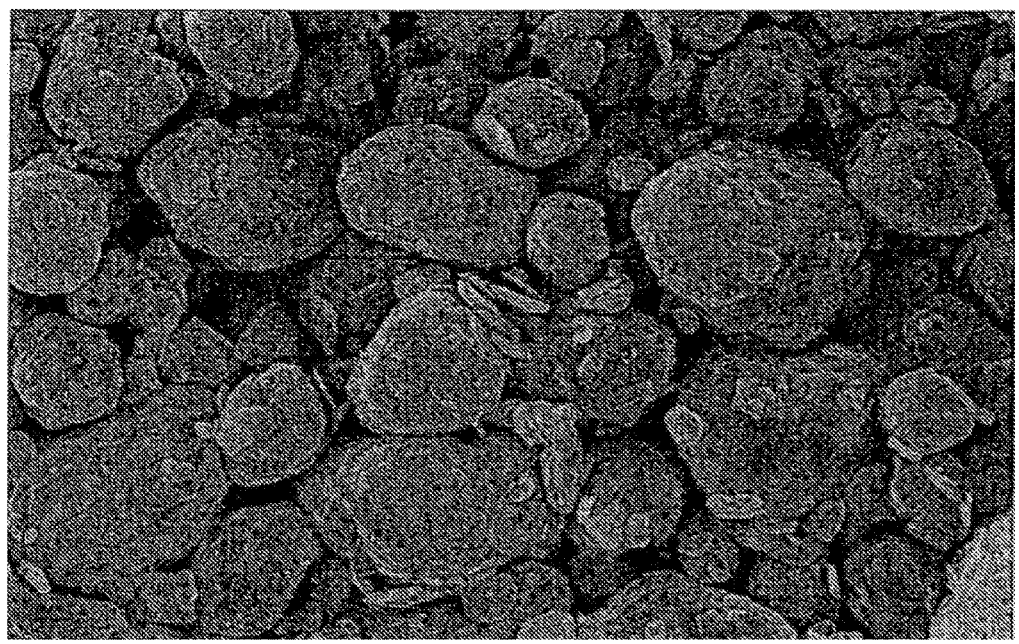
FIG. 5: An image of Test No. 5 pigment obtained by electron microscope of the LEO 435VPi type from LEO Elektronenmikroskopie GmbH.
Figure 6:
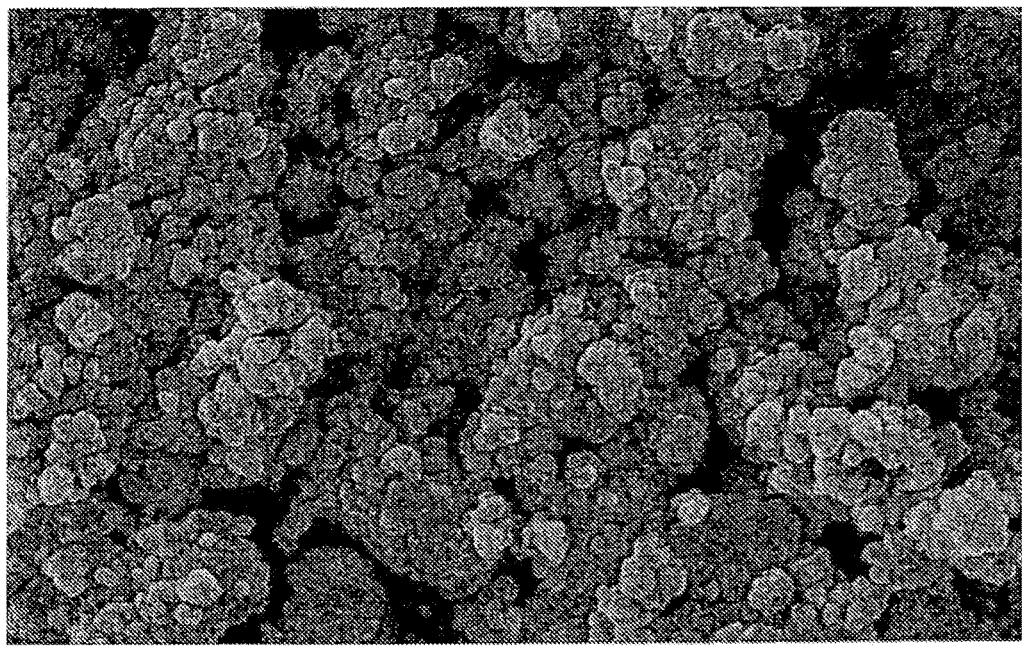
FIG. 6: An image of Test No. 6 pigment obtained by electron microscope of the LEO 435VPi type from LEO Elektronenmikroskopie GmbH.
Figure 7:
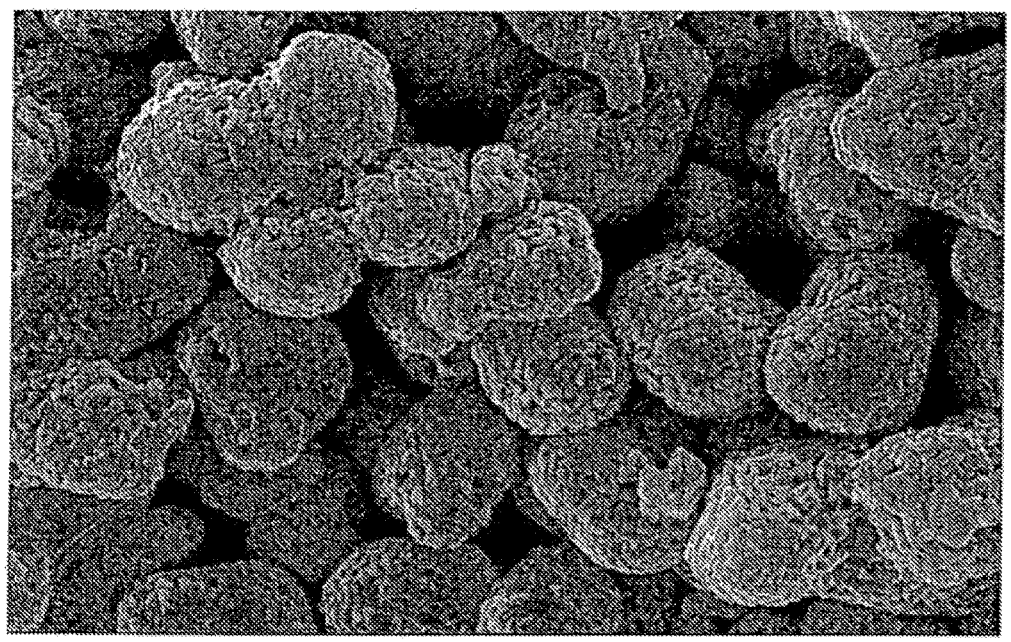
FIG. 7: An image of Test No. 11 pigment obtained by electron microscope of the LEO 435VPi type from LEO Elektronenmikroskopie GmbH.
Figure 8:
FIG. 8: An image of the result of printing on paper coated with the coating color containing the pigment of Test No. 1.
Figure 9:
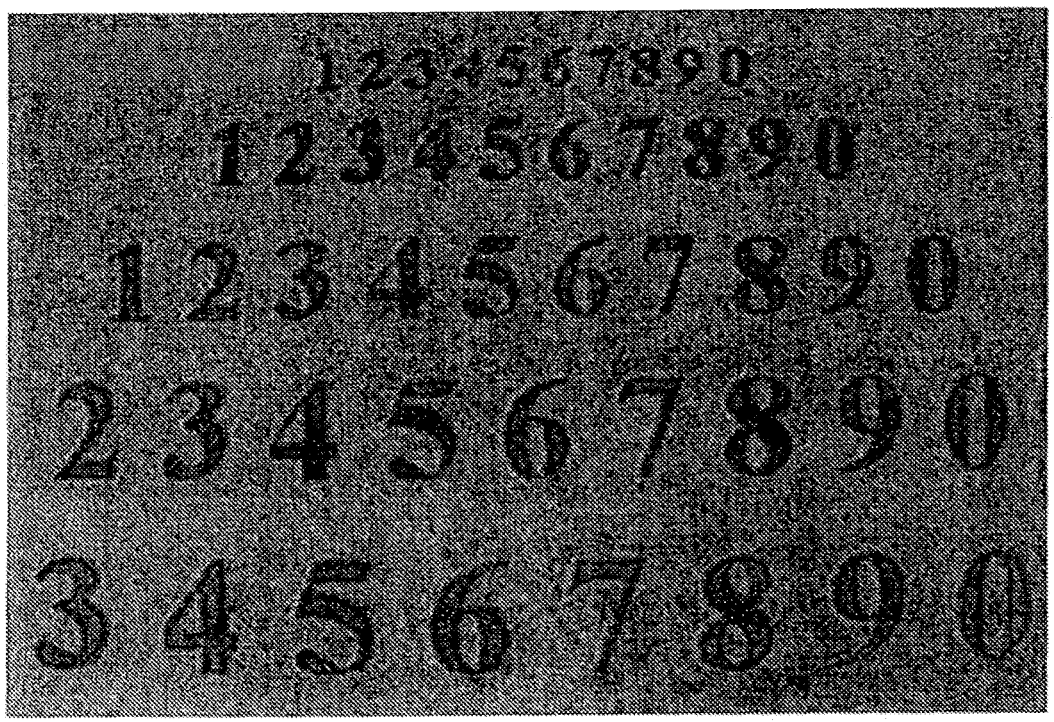
FIG. 9: An image of the result of printing on paper coated with the coating color containing the pigment of Test No. 6.
Figure 10:
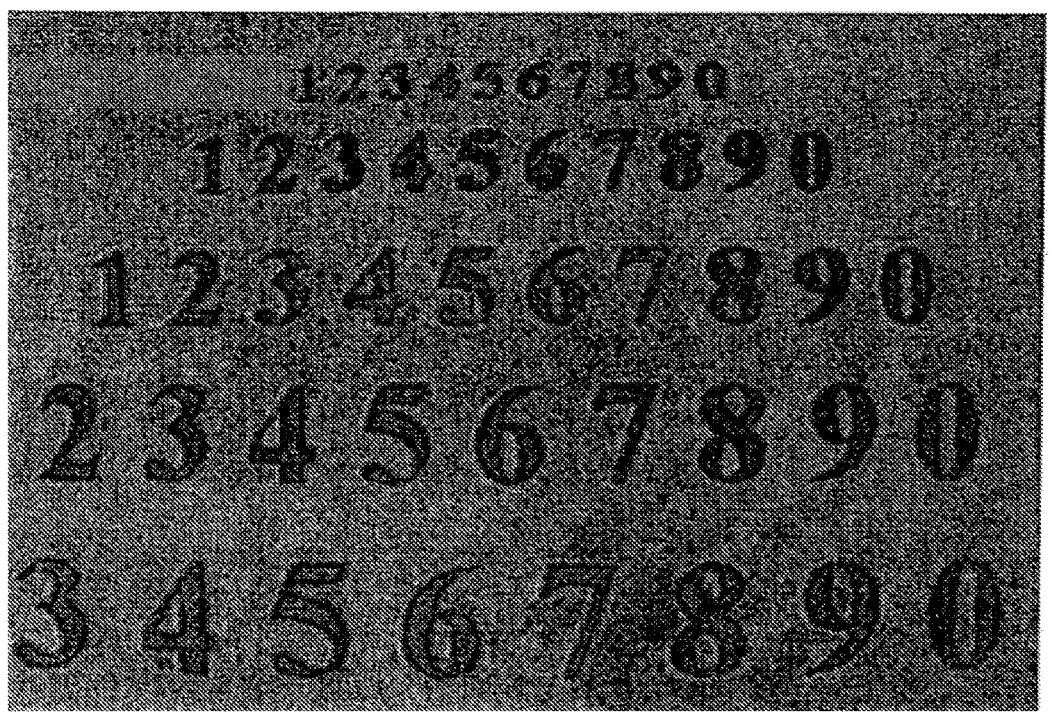
FIG. 10: An image of the result of printing on paper coated with the coating color containing the pigment of Test No. 7.
Figure 11:
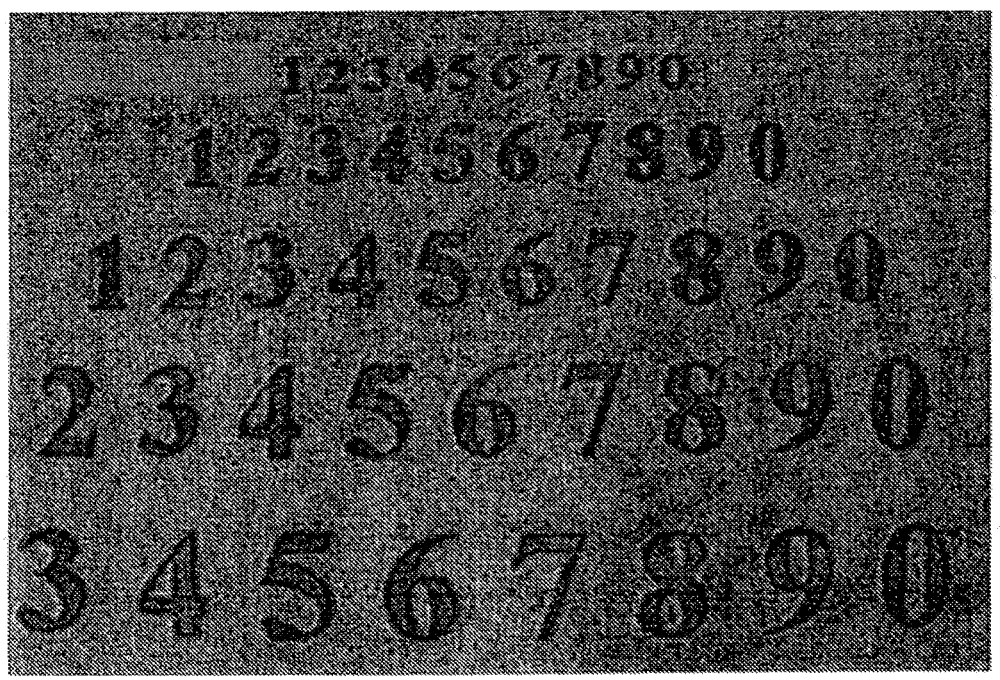
FIG. 11: An image of the result of printing on paper coated with the coating color containing the pigment of Test No. 8.
Figure 12:
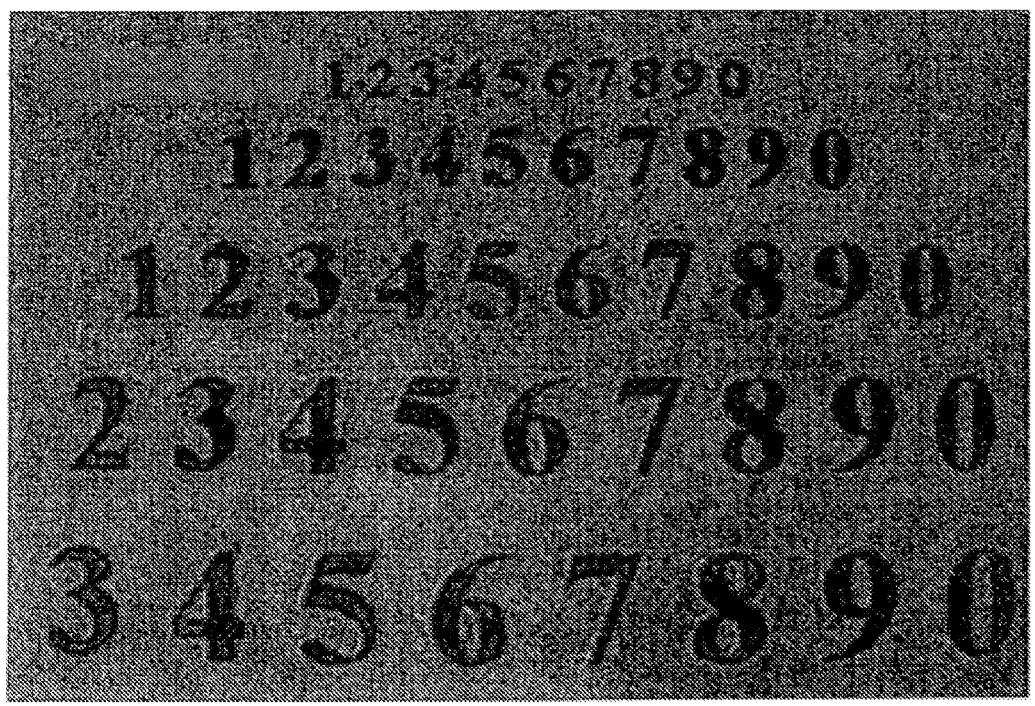
FIG. 12: An image of the result of printing on paper coated with the coating color containing the pigment of Test No. 9.
Figure 13:
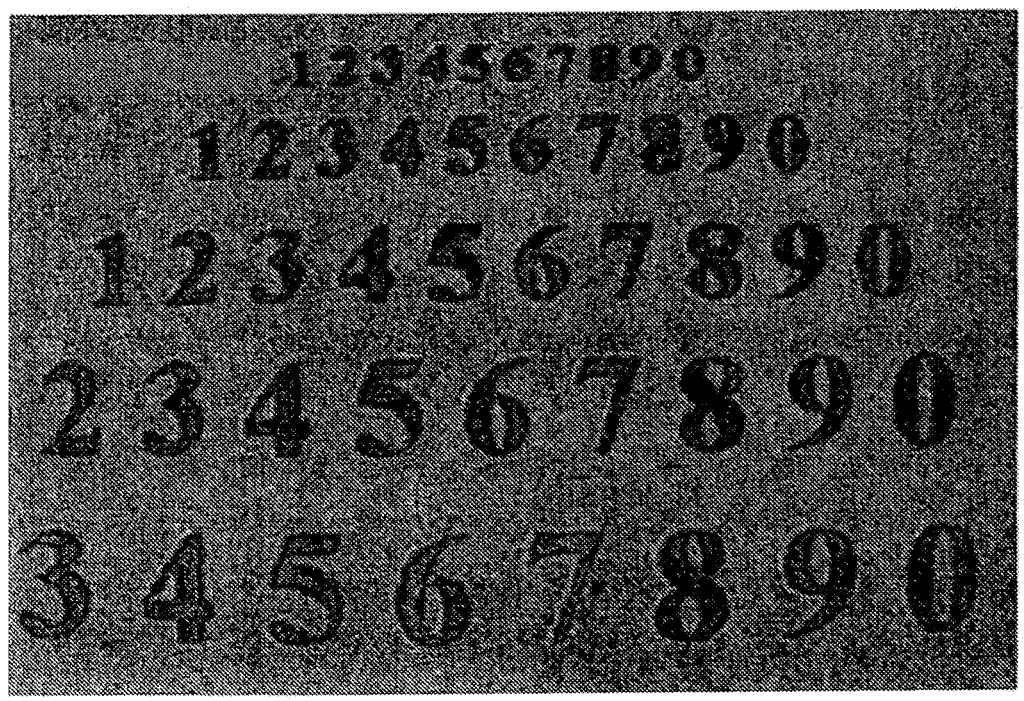
FIG. 13: An image of the result of printing on paper coated with the coating color containing the pigment of Test No. 10.
Figure 14:
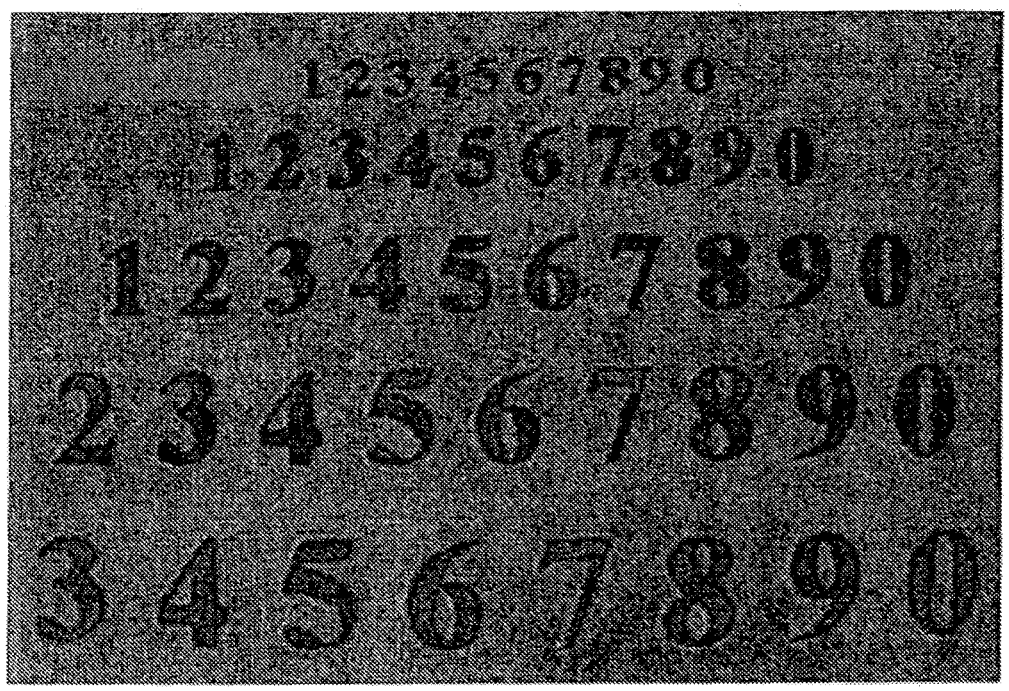
FIG. 14: An image of the result of printing on paper coated with the coating color containing the pigment of Test No. 11.

It is well known for the person skilled in the art to incorporate fillers or pigments such as calcium carbonate in the paper coating compositions used in the techniques of recording and printing by inkjet so that the paper rapidly absorbs the ink applied, thus giving improved print sharpness, less feathering and improved ability not to pass through the paper, that is to say improved print density whilst providing rapid printing.

It is also well known for the person skilled in the art to use sodium silicate for improving the properties of the calcium carbonate.

Thus the person skilled in the art knows patent application WO 98/20079 which, unlike the present invention, proposes a calcium carbonate containing at least 0.1% by weight, relative to the dry weight of calcium carbonate, of sodium silicate and at least 0.1% by weight, relative to the dry weight of calcium carbonate, of a weak acid or alum and teaches only the treatment of a calcium carbonate with sodium silicate and a so-called weak acid for making the said calcium carbonate resistant to acids in the manufacture of neutral to weakly acidic papers. Thus this document in no way teaches the solution proposed by the present invention with a view to obtaining the performance required by new paper printing techniques.

Similarly, patent application WO 95/03251, which describes a simple addition of an aqueous solution of sodium silicate in a milk of lime and then a reaction of the said lime with carbon dioxide gas at high temperature in order to form a calcium carbonate intended to replace titanium dioxide as a mass filler for the paper, teaches nothing able to resolve the present problem.

Another patent application WO 00/26305 describes the addition of sodium silicate to a suspension of calcium carbonate but without the use of an $H_3O^+$ ion donor and this method does not make it possible to obtain sufficient print density to fully satisfy the end user.

Another document of the prior art, WO 01/92422, which describes a method of manufacturing a composite pigment of calcium carbonate and silicate by the addition of sodium silicate to a precipitated calcium carbonate at the end of the precipitation of the calcium carbonate with carbon dioxide gas in order to obtain a composite pigment with a BET specific surface of between 5 and 25 $m^2/g$, thus proposes the use of a soluble silicate without the use of moderately strong to strong $H_3O^+$ ion donors describing a different technique which results in a high level of bleeding present on the sheet during coating.

The teaching of all this prior art relating to the treatment of calcium carbonate with sodium silicate does not enable the person skilled in the art to obtain the performance required by the new paper printing techniques.

Therefore there exists an important need on the part of the end user aiming to obtain a high-density printing paper during inkjet printing, that is to say to obtain a paper having a reduction in ink feathering and an increase in the ability of the ink not to go through the paper.

Moreover, WO 00/39222 describes a method for forming a pigment affording a reduction in the weight of the paper for a given thickness but teaches no solution to the problem resolved by the present invention, namely an improvement in the properties of the paper consisting of a reduction in ink feathering during printing of the sheet of paper containing the same pigment in its mass and in the coating, these printings being carried out at the very high speeds used in the new printing techniques.

Another document, "Nordic Pulp and Paper Research Journal", Vol 17 No 2/2002, pp 119-129, which describes the control of the absorption dynamics of the water-based ink in the porous pigmented coating structures for improving print performance, shows that the volume of the pore of the coating corresponds to the potential for absorption of the water coming from the inks, such as digital printing inks on a non-absorbent base, in no way speaking of improving the print density.

Continuing its research for reducing ink feathering of the papers as well as increasing the ability of the ink not to go through the paper, commonly referred to in the papermaking field as "ink strike through" in the mass of the sheet with the same pigment, the Applicant then, surprisingly, found that a mineral pigment containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminium hydroxide and/or at least one sodium and/or potassium aluminate, and containing less than 0.1% by weight silicate of a monovalent salt such as sodium, potassium or lithium silicate or mixtures thereof, preferably such as sodium silicate, relative to the dry weight of calcium carbonate, makes it possible to obtain a paper with a reduced ability to form ink feathering on coated papers and improved ability of the ink not to go through the paper, normally referred to in the papermaking field as "ink strike through", in the mass of a sheet during inkjet printing.

In addition the Applicant has also found that the aforementioned mineral pigment according to the invention enables the behaviour of the formulation for inkjet printing to be improved.

In addition, the Applicant has also found that the aforementioned mineral pigment according to the invention makes it possible to obtain a pigment which can be used both as a mass filler and in coating and that this pigment is independent of the coating systems used, that is to say this pigment can be used both in a mass filler application and in a coating application using indifferently a size press, or a film press, or a jet coater or a blade coater.

The Applicant has also developed a method of obtaining a mineral pigment containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate, making it possible to obtain a high-density printing paper during inkjet printing.

The object of the invention is therefore a mineral pigment containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate, and containing less than 0.1% by weight of silicate of a monovalent salt such as sodium, potassium or lithium silicate or mixtures thereof, preferably such as sodium silicate, relative to the dry weight of the calcium carbonate, making it possible to obtain a high-density printing paper during inkjet printing.

Another object of the invention concerns the aqueous suspension of the mineral pigment according to the aforementioned invention.

Another object of the invention is also a method of manufacturing a mineral pigment containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or at least one aluminium hydroxide and/or at least one sodium and/or potassium aluminate, and containing less than 0.1% by weight of silicate of a monovalent salt such as sodium, potassium or lithium silicate or mixtures thereof, preferably such as sodium silicate, relative to the dry weight of calcium carbonate.

Another object of the invention is the mineral pigment obtained by the method according to the invention as well as its use as a mass filler in the manufacture of the sheet of paper and its use in the operations of surface treatment of the paper and/or coating of the paper.

Finally, another object of the invention is the paper for inkjet printing containing the mineral pigment according to the invention.

The mineral pigment according to the invention is characterised in that it contains a product formed in situ by the double and/or multiple reaction between a calcium carbonate and the reaction product or products of the said carbonate with gaseous $CO_2$ formed in situ and/or coming from an external supply, and the reaction product or products of the said carbonate with one or more moderately strong to strong $H_3O^+$ ion donors and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminium hydroxide and/or at least one sodium and/or potassium aluminate, and in that it contains less than 0.1% by weight of silicate of a monovalent salt such as sodium, potassium or lithium silicate or mixtures thereof, preferably such as sodium silicate, relative to the dry weight of the calcium carbonate, and is characterised in that it has a pH greater than 7.5 measured at 20° C.

In particular, the mineral pigment according to the invention is characterised in that the calcium carbonate is a natural calcium carbonate or a mixture of natural calcium carbonate with talc, kaolin, titanium dioxide, magnesium oxide or with any mineral which is inert vis-à-vis moderately strong to strong $H_3O^+$ ion donors.

In an entirely preferred manner this natural calcium carbonate is chosen from amongst a marble, a calcite, a chalk, a dolomite or mixtures thereof.

It is also characterised in particular in that the strong $H_3O^+$ ion donors are chosen from amongst strong acids or mixtures thereof generating $H_3O^+$ ions and are preferentially chosen from amongst acids having a $pK_a$ of less than or equal to zero at 22° C. and more particularly chosen from amongst sulphuric acid, hydrochloric acid or mixtures thereof and is characterised in that the moderately strong $H_3O^+$ ion donors are chosen from amongst acids having a $pK_a$ of between 0 and 2.5 inclusive at 22° C. and more particularly chosen from amongst $H_2SO_3$, $HSO_4^-$, $H_3PO_4$, oxalic acid or mixtures thereof, and more preferentially from amongst acids forming bivalent cation salts, such as calcium, which are almost insoluble in water, that is to say with a solubility of less than 0.01% by weight.

The mineral pigment according to the invention is particularly characterised in that it has a BET specific surface area of between 25 m²/g and 200 m²/g measured according to ISO 9277, preferentially between 30 m²/g and 80 m²/g and highly preferentially between 35 m²/g and 60 m²/g as well as a median diameter, determined by a measurement with a Sedigraph™ 5100, of between 0.1 and 50 micrometers, preferentially between 0.5 and 40 micrometers and highly preferentially between 1 and 10 micrometers.

The aqueous suspension according to the invention is characterised in that it contains the mineral pigment according to the invention.

The method of manufacturing, according to the invention, of a mineral pigment in the dry state or in aqueous suspension containing a product formed in situ by the double and/or multiple reaction between a calcium carbonate and the reaction product or products of the said carbonate with gaseous CO$_2$ formed in situ and/or coming from an external supply, and the reaction product or products of the said carbonate with one or more moderately strong to strong H$_3$O$^+$ ion donors and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminium hydroxide and/or at least one sodium and/or potassium aluminate, and containing less than 0.1% by weight silicate of a monovalent salt such as sodium, potassium or lithium silicate or mixtures thereof, preferably such as sodium silicate, relative to the dry weight of the calcium carbonate, is characterised in that it comprises the following steps:

a) the treatment of the calcium carbonate in aqueous phase with the moderately strong to strong H$_3$O$^+$ ion donor or donors and the treatment with the gaseous CO$_2$ formed in situ and/or coming from an external supply, which treatment which is an integral part of step a), b) the addition, prior to and/or simultaneous with step a), of at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and possibly the prior and/or simultaneous addition of a sodium and/or potassium aluminate, c) possibly the addition of a base, preferably a bivalent ion base, highly preferentially lime and/or calcium carbonate in dry form or in aqueous suspension possibly containing one or more anionic, cationic and/or weakly anionic dispersing agents, d) possibly putting in anionic aqueous suspension the product obtained in step b) or c) at a concentration of dry matter of between 1% and 80% using possibly at least one anionic electrolyte, e) possibly putting the product obtained in step b) or c) in cationic aqueous suspension by the addition of at least one cationic electrolyte, f) possibly putting the product obtained in step b) or c) in weakly anionic aqueous suspension by the addition of at least one weakly anionic electrolyte, g) possibly drying after one of steps c) to f).

In particular, the method according to the invention is characterised in that the calcium carbonate is a natural calcium carbonate or a mixture of natural calcium carbonate with talc, kaolin, titanium dioxide, magnesium oxide or with any mineral which is inert vis-à-vis moderately strong to strong H$_3$O$^+$ ion donors and entirely preferably this natural calcium carbonate is chosen from amongst a marble, a calcite, a chalk, a dolomite or mixtures thereof.

More particularly, the method according to the invention is characterised in that the moderately strong to strong H$_3$O$^+$ ion donor or donors are chosen from amongst any moderately strong to strong acid, or any mixture of such acids, generating H$_3$O$^+$ ions and in particular generating H$_3$O$^+$ ions under the conditions of the treatment.

According to one embodiment which is also preferred, the strong acid will be chosen from amongst acids having a pK$_a$ of less than or equal to zero at 22° C. and more particularly chosen from amongst sulphuric acid, hydrochloric acid or mixtures thereof.

According to an embodiment which is also preferred, the moderately strong acid will be chosen from amongst acids having a pK$_a$ of between 0 and 2.5 inclusive at 22° C. and more particularly chosen from amongst H$_2$SO$_3$, HSO$_4^-$, H$_3$PO$_4$, oxalic acid or mixtures thereof and even more preferentially from amongst acids forming bivalent cation salts, such as calcium, which are almost insoluble in water, that is to say with a solubility of less than 0.01% by weight. It is possible to cite in particular for example the pK$_{a1}$ of H$_3$PO$_4$ of 2.161 (Römpp Chemie, published by Thieme).

According to an embodiment which is also preferred, the strong acid or acids can be mixed with the moderately strong acid or acids.

According to the invention, the molar quantity of moderately strong to strong H$_3$O$^+$ ion donors relative to the number of moles of CaCO$_3$ is in total between 0.05 and 1, preferentially between 0.1 and 0.5.

According to a preferred embodiment, step a) and/or step b) can be repeated several times.

Similarly according to a preferred embodiment, the temperature during step a) of the treatment is between 5° C. and 100° C., and preferentially between 65° C. and 90° C.

Also preferably, the duration of steps a) to c) of the treatment is 0.01 hours to 24 hours and preferentially from 0.2 hours to 6 hours.

According to yet another preferred embodiment, between one hour and twenty-four hours and more particularly between one hour and five hours after the end of the treatment, the pH is greater than 7.5 and the content of monovalent salt silicate such as sodium, potassium or lithium silicate or mixtures thereof is less than 0.1% by weight relative to the dry weight of calcium carbonate.

The treatment method according to the invention is implemented in aqueous phase at moderately strong or strong low concentrations of dry matter, but can also be implemented for mixtures of slurries consisting of these various concentrations.

Preferentially, the dry matter content is between 0.3% and 80% by weight, highly preferentially between 15% and 60%.

Entirely preferably, the method according to the invention is characterised in that step b) is an addition of 0.1% to 25%, preferentially 5% to 10% by dry weight relative to the dry weight of calcium carbonate.

Step d) particularly uses from 0.05% to 5.0% by dry weight of an anionic electrolyte chosen from amongst the homopolymers or copolymers in the non-neutralised, partially neutralised or completely neutralised acidic state, of monomers with ethylenic unsaturation and a monocarboxylic function such as acrylic or methacrylic acid or the hemiesters of diacids such as C$_1$ to C$_4$ monoesters of maleic or itaconic acids, or mixtures thereof, or with a dicarboxylic function chosen from amongst the ethylenically unsaturated monomers with a dicarboxylic function such as crotonic, isocrotonic, cinnamic, itaconic or maleic acid, or anhydrides of carboxylic acids such as maleic anhydride or with a sulphonic function chosen from amongst ethylenically unsaturated monomers with a sulphonic function such as acrylamido-methyl-propane-sulphonic acid, sodium methallylsulphonate, vinyl sulphonic acid and styrene sulphonic acid or with a phosphoric function chosen from amongst ethylenically unsaturated monomers with a phosphoric function such as vinyl phosphoric acid, ethylene glycol methacrylate phosphate, propylene glycol methyacrylate phosphate, ethylene glycol acrylate phosphate, propylene glycol acrylate phosphate and ethoxylates thereof or with a phosphonic function chosen from amongst ethylenically unsaturated monomers with a phosphonic function such as vinyl phosphonic acid or mixtures thereof or polyphosphates.

Similarly step e) uses, particularly, from 0.05% to 5.0% by dry weight of a cationic electrolyte chosen from amongst the homopolymers or copolymers of ethylenically unsaturated cationic monomers or quaternary ammonium such as [2-(methacryloyloxy)ethyl]trimethyl ammonium sulphate or chloride, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, or [3-(methacrylamido)propyl]trimethyl ammonium chloride or sulphate.

Similarly step f) uses, particularly, from 0.05% to 5.0% by dry weight of a weakly anionic electrolyte chosen from amongst the weakly ionic and water-soluble copolymers composed of:
- a) at least one anionic monomer with a carboxylic or dicarboxylic or phosphoric or phosphonic or sulphonic function or a mixture thereof,
- b) at least one non-ionic monomer, the non-ionic monomer consisting of at least one monomer of formula (I):

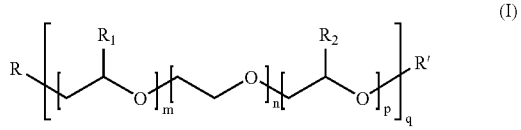

in which:
m and p represent a number of alkylene oxide units less than or equal to 150,
n represents a number of ethylene oxide units less than or equal to 150,
q represents an integer number at least equal to 1 and such that $5 \le (m+n+p)_q \le 150$, and preferentially such that $15 \le (m+n+p)_q \le 120$,
$R_1$ represents hydrogen or the methyl or ethyl radical,
$R_2$ represents hydrogen or the methyl or ethyl radical,
R represents a radical containing a polymerisable unsaturated function, preferentially belonging to the vinyl group and to the group of acrylic, methacrylic, maleic, itaconic, crotonic or vinylphthalic esters as well as to the group of urethane unsaturates such as for example acrylurethane, methacrylurethane, α-α' dimethyl-isopropenyl-benzylurethane, or allylurethane, and to the group of allyl or vinyl ethers, whether or not substituted, or to the group of ethylenically unsaturated amides or imides,
R' represents hydrogen or a hydrocarbon radical having 1 to 40 carbon atoms, and preferentially represents a hydrocarbon radical having 1 to 12 carbon atoms and highly preferentially a hydrocarbon radical having 1 to 4 carbon atoms,
or a mixture of several monomers of formula (1),
- c) possibly at least one monomer of the acrylamide or methacrylamide type or derivatives thereof such as N-[3-(dimethylamino) propyl]acrylamide or N-[3-(dimethylamino)propyl]methacrylamide, and mixtures thereof, or at least one non-water soluble monomer such as alkyl acrylates or methacrylates, unsaturated esters such as N-[2-(dimethylamino)ethyl]methacrylate, or N-[2-(dimethylamino) ethyl]acrylate, vinyls such as vinyl acetate, vinylpyrrolidone, styrene, alphamethylstyrene and derivatives thereof, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido) propyl]trimethyl ammonium chloride or sulphate, dimethyl diallyl ammonium chloride or sulphate, [3-(methacrylamido)propyl]trimethyl ammonium chloride or sulphate, or at least one organofluorinated or organosililated monomer, or a mixture of several of these monomers,
- d) possibly at least one monomer possessing at least two ethylenic unsaturations referred to in the remainder of the application as a cross-linking monomer.

The mineral pigment containing a product formed in situ according to the invention is characterised in that it is obtained by the method according to the invention.

This product then contains less than 0.1% by weight silicate of a monovalent salt such as sodium, potassium or lithium silicate or mixtures thereof, preferably such as sodium silicate, relative to the dry weight of calcium carbonate.

More particularly, the mineral pigment obtained by the method according to the invention is characterised in that it has a BET specific surface area of between 25 m²/g and 200 m²/g measured according to ISO 9277, preferentially between 30 m²/g and 80 m²/g and highly preferentially between 35 m²/g and 60 m²/g, and a median diameter, determined by a measurement with a Sedigraph™ 5100, of between 0.1 and 50 micrometers, preferentially between 0.5 and 40 micrometers and highly preferentially between 1 and 10 micrometers.

In another variant, the aqueous suspension of the mineral pigment obtained according to step d) is characterised in that the mineral pigment has a specific surface area of between 25 m²/g and 200 m²/g measured according to the BET method, preferentially between 30 m²/g and 80 m²/g and highly preferentially between 35 m²/g and 60 m²/g, and a median diameter, determined by a measurement with a Sedigraph™ 5100, between 0.1 and 50 micrometers, preferentially between 0.5 and 40 micrometers and highly preferentially between 1 and 10 micrometers, and in that the suspension has a dry matter content of between 0.3% and 80%, preferentially between 15% and 60%, and in that it contains 0.05% to 5.0% by dry weight, relative to the dry weight of calcium carbonate, of at least one anionic electrolyte.

This anionic electrolyte is chosen from amongst the previously cited anionic electrolytes.

Still more particularly, the aqueous suspension of the mineral pigment obtained according to step e) is characterised in that the mineral pigment has a BET specific surface area of between 25 m²/g and 200 m²/g measured according to ISO 9277, preferentially between 30 m₂/g and 80 m²/g and highly preferentially between 35 m²/g and 60 m²/g, and a median diameter, determined by a measurement with a Sedigraph™ 5100, between 0.1 and 50 micrometers, preferentially between 0.5 and 40 micrometers and highly preferentially between 1 and 10 micrometers, and in that the suspension has a dry matter content of between 0.3% and 80%, preferentially between 15% and 60%, and in that it contains 0.1% to 5.0% by dry weight, relative to the dry weight of calcium carbonate, of at least one cationic electrolyte.

This cationic electrolyte is chosen from amongst the previously cited cationic electrolytes.

In another particular variant, the aqueous suspension of the mineral pigment obtained according to step f) is characterised in that the mineral pigment has a BET specific surface area of between 25 m²/g and 200 m 2/g measured according to ISO 9277, preferentially between 30 m²/g and 80 m²/g and highly preferentially between 35 m²/g and 60 m₂/g, and a median diameter, determined by a measurement with a Sedigraph™ 5100, between 0.1 and 50 micrometers, preferentially between 0.5 and 40 micrometers and highly preferentially between 1 and 10 micrometers, and in that the suspension has a dry matter content of between 0.3% and 80%, preferentially between 15% and 60%, and in that it contains 0.1% to 5.0% by dry weight, relative to the dry weight of calcium carbonate, of at least one weakly anionic electrolyte.

According to a variant, the mineral pigment containing a product formed in situ according to the invention is characterised in that it is in dry form when step g) of the method according to the invention is implemented.

The paper for inkjet printing according to the invention is characterised in that it contains the mineral filler according to the invention in the mass and/or in the coating.

It is also characterised in that it contains the aqueous suspension of the new mineral pigment in the mass and/or in the coating.

The following examples illustrate the invention without however limiting the scope thereof.

EXAMPLE 1

This example illustrates the invention and the mineral pigment according to the invention. It concerns the method of manufacturing a mineral pigment containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminium hydroxide and/or at least one sodium and/or potassium aluminate, and the mineral pigment obtained by the method.

Test No. 1

This test illustrates the prior art.

0.5 kg, calculated as dry pigment, of natural calcium carbonate of the Norwegian marble type, with a granulometry such that 65% by weight of the particles have a diameter of less than 1 µm, measured by means of the Sedigraph™ 5100 from Micromeritics™, in the form of an aqueous suspension of 75% dry content, dispersed with 0.6% of a sodium polyacrylate, is diluted until an aqueous suspension of a concentration of dry matter of 15% by weight is obtained, with distilled water, in a 10 litre container. The suspension thus formed is then treated with 10% phosphoric acid in a 10% solution by weight, at 65° C. under stirring for 20 minutes at 500 revolutions per minute. After 15 minutes, $CO_2$ is bubbled through the suspension of calcium carbonate for 1 hour. Next the pH was adjusted to between 8 and 8.5 with a suspension of lime at a concentration equal to 10% by dry weight.

The mineral pigment obtained has a dry content equal to 18.8%, a BET specific surface area equal to 31.7 $m^2/g$ (measured according to ISO 9277) and a pH equal to 8.4.

Appendix 1 shows the image of the pigment obtained by electron microscope of the LEO 435VPi type from LEO Elektronenmikroskopie GmbH.

Test No 2

This test illustrates the prior art.

0.5 kg, calculated as dry pigment, of natural calcium carbonate of the Norwegian marble type, with a granulometry such that 65% by weight of the particles have a diameter of less than 1 µm, measured by means of the Sedigraph™ 5100 from Micromeritics™, in the form of an aqueous suspension of 75% dry content, dispersed with 0.6% of a sodium polyacrylate, is diluted until an aqueous suspension of a concentration of dry matter of 15% by weight is obtained, with distilled water, in a 10 litre container. The suspension thus formed is then treated with 25% phosphoric acid in a 10% solution by weight, at 65° C. under stirring for 20 minutes at 500 revolutions per minute. After 15 minutes, $CO_2$ is bubbled through the suspension of calcium carbonate for 1 hour. Next the pH was adjusted to between 8 and 8.5 with a suspension of lime at a concentration equal to 10% by dry weight.

The mineral pigment obtained has a dry content equal to 18.8%, a BET specific surface area equal to 31.7 $m^2/g$ (measured according to ISO 9277) and a pH equal to 8.4.

Appendix 2 shows the image of the pigment obtained by electron microscope of the LEO 435VPi type from LEO Elektronenmikroskopie GmbH.

Test No 3

This test illustrates the prior art.

To do this, 0.5 kg, calculated as dry pigment, of natural calcium carbonate of the Norwegian marble type, with a granulometry such that 65% by weight of the particles have a diameter of less than 1 micrometer, measured by means of the Sedigraph™ 5100 from Micromeritics™, and a BET specific surface area of 15.5 $m^2/g$ (measured according to ISO 9277) in the form of a dispersion or slurry with a dry matter concentration equal to 75% is diluted with a dispersing agent of the sodium polyacrylate type, and then dilution is carried out again with water until a slurry is obtained with a dry matter concentration of 20% by weight, in a 10 litre container. The slurry thus formed is treated with 20% phosphoric acid in a 10% solution by weight, at 65° C. under slight stirring at a rate of 30 l/min under atmospheric pressure at the bottom of the container for 2 hours. After 2 hours, $CO_2$ is bubbled through the suspension of calcium carbonate for 1 hour.

The filler has the following characteristics:
  Mean grain diameter, analysed by visual method under electron microscope: approximately 3-5 micrometers.
  BET specific surface area (measured according to ISO 9277): 41.2 $m_2/g$.

Appendix 3 shows the image of the pigment obtained by electron microscope of the LEO 435VPi type from LEO Elektronenmikroskopie GmbH.

Test No 4

This test illustrates the prior art.

To do this, 100 kg, calculated as dry pigment, of natural calcium carbonate of the Norwegian marble type, with a granulometry such that 65% by weight of the particles have a diameter of less than 1 micrometer, measured by means of the Sedigraph™ 5100 from Micromeritics™, and a BET specific surface area of 15 $m^2/g$ (measured according to ISO 9277) in the form of a dispersion or slurry with a dry matter concentration of 75% is diluted with a dispersing agent of the sodium polyacrylate type, with water until a slurry is obtained with a dry matter concentration of 10% by weight, in a 3000 litre container. Then the slurry thus formed is treated with 30% phosphoric acid in solution at approximately 15% by weight, at 65° C. continuously in four 25 litre cells apportioning ¼ of the phosphoric acid in each cell under slight stirring at a rate of 50 litres/min under atmospheric pressure at the bottom of each cell. The retention of the product in each of the cells was 15 min.

The filler has the following characteristics:
Concentration of slurry: approximately 20%
Mean diameter of grain analysed by visual method under electron microscope: approximately 7-10 micrometers
BET specific surface area (measured according to ISO 9277): 45.7 m$^2$/g.

Appendix 4 shows the image of the pigment obtained by electron microscope of the LEO 435VPi type from LEO Elektronenmikroskopie GmbH.

Test No 5

This test illustrates the prior art.

To do this, 5 kg, calculated as dry pigment, of natural calcium carbonate of the Norwegian marble type, with a granulometry such that 65% by weight of the particles have a diameter of less than 1 micrometer, measured by means of the Sedigraph™ 5100 from Micromeritics™, and a BET specific surface area of 15.5 m$_2$/g (measured in according to ISO 9277) in the form of a dispersion or slurry with a dry matter concentration equal to 75% is diluted with a dispersing agent of the sodium polyacrylate type, and then dilution is carried out again with water until a slurry is obtained with a dry matter concentration of 20% by weight, in the 10 litre container. The slurry thus formed is then treated with 50% phosphoric acid in a 10% solution by weight, at 65° C. under slight stirring at a rate of 30 litres/min under atmospheric pressure at the bottom of the container for 2 hours. After 2 hours, $CO_2$ is bubbled through the suspension of calcium carbonate for 1 hour. 24 hours later, the pigment is dried by means of a dryer of the "spray dryer" type.

The filler has the following characteristics:
For the pigment:
mean diameter of grain analysed by visual method under electron microscope: 5 micrometers
BET specific surface area (measured according to ISO 9277): 41.2 m$^2$/g.

Appendix 5 shows the image of the pigment obtained by electron microscope of the LEO 435VPi type from LEO Elektronenmikroskopie GmbH.

Test No 6

This test illustrates the invention.

1500 g, calculated as dry pigment, of natural calcium carbonate of the Norwegian marble type, with a granulometry such that 65% by weight of the particles have a diameter of less than 1 μm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 65° C. with 150 g, calculated as dry sodium silicate, of Stixso RR, PQ Corporation, Valley Forge, Pa., USA, a sodium silicate of the $SiO_2/Na_2O$=3.22 type in the form of a 30% solution of dry content, for 30 minutes. Then the suspension thus formed is treated at 65° C. with 10% phosphoric acid in solution at 30% by weight, at 65° C. under stirring for 30 minutes at 500 revolutions per minute.

Next the pH was adjusted to between 8 and 8.5 with a suspension of lime at a concentration equal to 10% by dry weight.

After 60 minutes of stirring at 500 revolutions per minute, the product was cooled to 23° C.

The mineral pigment obtained has a dry content equal to 18.8%, a BET specific surface area equal to 39.4 m$^2$/g (measured according to ISO 9277) and a pH equal to 8.4 and a quantity of sodium silicate (soluble in the aqueous phase of the suspension), measured by Inductively Coupled Plasma—Optical Emission Spectroscopy (ICP-OES) equal to 220 ppm of Si.

Appendix 6 shows the image of the pigment obtained by electron microscope of the LEO 435VPi type from LEO Elektronenmikroskopie GmbH.

Test No 7

This test illustrates the invention.

1500 g, calculated as dry pigment, of natural calcium carbonate of the Norwegian marble type, with a granulometry such that 65% by weight of the particles have a diameter of less than 1 μm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 65° C. with 150 g, calculated as dry sodium silicate, of Inosil Na 4237, Van Baerle, CH 4142 Münchenstein, Switzerland, a sodium silicate of the $SiO_2/Na_2O$=3.29 type in the form of a 30% solution of dry content, for 30 minutes. Then the suspension thus formed is treated at 65° C. with 10% phosphoric acid in solution at 30% by weight, at 65° C. under stirring for 30 minutes at 500 revolutions per minute.

Next the pH was adjusted to between 8 and 8.5 with a suspension of lime at a concentration equal to 10% by dry weight.

After 60 minutes of stirring at 500 revolutions per minute, the product was cooled to 23° C.

The mineral pigment obtained has a dry content equal to 19.1%, a BET specific surface area equal to 39.9 m$^2$/g (measured according to ISO 9277) and a pH equal to 8.6 and a quantity of sodium silicate (soluble in the aqueous phase of the suspension), measured by Inductively Coupled Plasma—Optical Emission Spectroscopy (ICP-OES) equal to 150 ppm of Si.

Test No 8

This test illustrates the invention.

1500 g, calculated as dry pigment, of natural calcium carbonate of the Norwegian marble type, with a granulometry such that 65% by weight of the particles have a diameter of less than 1 μm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 65° C. with 150 g, calculated as dry sodium silicate, of Inosil Na 4237, Van Baerle, CH 4142 Münchenstein, Switzerland, a sodium silicate of the $SiO_2/Na_2O$=3.29 type in the form of a 30% solution of dry content, for 2 minutes. Then the suspension thus formed is treated at 65° C. with 10% phosphoric acid in solution at 30% by weight, at 65° C. under stirring for 2 minutes at 500 revolutions per minute.

Next the pH was adjusted to between 8 and 8.5 with a suspension of lime at a concentration equal to 10% by dry weight.

After 60 minutes of stirring at 500 revolutions per minute, the product was cooled to 23° C.

The mineral pigment obtained has a dry content equal to 19.2%, a BET specific surface area equal to 46.6 m$^2$/g (measured according to ISO 9277) and a pH equal to 8.3 and a quantity of sodium silicate (soluble in the aqueous phase of the suspension), measured by Inductively Coupled Plasma—Optical Emission Spectroscopy (ICP-OES) equal to 140 ppm of Si.

Test No 9

This test illustrates the invention.

1500 g, calculated as dry pigment, of natural calcium carbonate of the Norwegian marble type, with a granulometry such that 65% by weight of the particles have a diameter of less than 1 µm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 65° C. with 150 g, calculated as dry sodium silicate, of Inosil Na 4237, Van Baerle, CH 4142 Münchenstein, Switzerland, a sodium silicate of the $SiO_2/Na_2O=3.29$ type in the form of a 30% solution of dry content, for 30 minutes. Then the suspension thus formed is treated at 65° C. with 10% phosphoric acid in solution at 30% by weight, at 65° C. under stirring for 30 minutes at 500 revolutions per minute.

Next the pH was adjusted to between 8 and 8.5 with a suspension of lime at a concentration equal to 10% by dry weight.

After 60 minutes of stirring at 500 revolutions per minute, the product was cooled to 23° C.

The mineral pigment obtained has a dry content equal to 18.8%, a BET specific surface area equal to 71.2 $m^2/g$ (measured according to ISO 9277) and a pH equal to 8.2 and a quantity of sodium silicate (soluble in the aqueous phase of the suspension), measured by Inductively Coupled Plasma—Optical Emission Spectroscopy (ICP-OES) equal to 170 ppm of Si.

Test No 10

This test illustrates the invention.

1500 g, calculated as dry pigment, of natural calcium carbonate of the Norwegian marble type, with a granulometry such that 65% by weight of the particles have a diameter of less than 1 µm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 65° C. with 150 g, calculated as dry aluminium hydroxide, of Martifin OL 107, Martinwerk GmbH, Bergheim, Germany, of an aluminium hydroxide powder, in the form of a powder for 30 minutes.

Then the suspension thus formed is treated at 65° C. with 150 g, calculated as dry sodium silicate, of Inosil Na 4237, Van Baerle, CH 4142 Münchenstein, Switzerland, a sodium silicate of the $SiO_2/Na_2O=3.29$ type in the form of a 30% solution of dry content, for 30 minutes. Then the suspension thus formed is treated at 65° C. with 10% phosphoric acid in solution at 30% by weight, at 65° C. under stirring for 30 minutes at 500 revolutions per minute.

Next the pH was adjusted to between 8 and 8.5 with a suspension of lime at a concentration equal to 10% by dry weight.

After 60 minutes of stirring at 500 revolutions per minute, the product was cooled to 23° C.

The mineral pigment obtained has a dry content equal to 19.6%, a BET specific surface area equal to 39.6 $m_2/g$ (measured according to ISO 9277) and a pH equal to 8.2.

Test No 11

This test illustrates the invention.

To do this, 1500 g, calculated as dry pigment, of natural calcium carbonate of the Norwegian marble type, with a granulometry such that 65% by weight of the particles have a diameter of less than 1 µm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 65° C. with 64.7 g, calculated as aluminium silicate, from Zeocross CG 180, Crossfield, Joliet, Ill., USA, in the form of a 4.3% solution of dry content in distilled water for 30 minutes. Then the suspension thus formed is treated at 65° C. with 35% phosphoric acid in solution at 30% by weight, at 65° C. under stirring for 30 minutes at 500 revolutions per minute.

Then the pH was adjusted to between 8 and 8.5 with a suspension of lime at a concentration of 10% by dry weight.

After 60 minutes of stirring at 500 revolutions per minute, the product was cooled to 23° C.

The mineral pigment obtained has a dry content of 15.1%, a BET specific surface area of 94.4 $m^2/g$ (measured according to ISO 9277) and a pH equal to 8.6.

Appendix 7 shows the image of the pigment obtained by electron microscope of the LEO 435VPi type from LEO Elektronenmikroskopie GmbH.

Test No 12

This test illustrates the invention.

To do this, 1500 g, calculated as dry pigment, of natural calcium carbonate of the Norwegian marble type, with a granulometry such that 65% by weight of the particles have a diameter of less than 1 µm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 70° C. with 90 g, calculated as dry sodium silicate, of Inosil Na 4237, Van Baerle, CH 4142 Münchenstein, Switzerland, a sodium silicate of the $SiO_2/Na_2O=3.29$ type in the form of a 30% solution of dry content, for 30 minutes. In parallel the suspension thus formed is treated at 65° C. with 15% phosphoric acid in solution at 30% by weight, at 65° C. under stirring for 60 minutes at 500 revolutions per minute.

Then the pH was adjusted to between 8 and 8.5 with a suspension of lime at a concentration equal to 10% by dry weight.

After 60 minutes of stirring at 500 revolutions per minute, the product was cooled to 23° C.

The mineral pigment obtained has a dry content equal to 18.8%, a BET specific surface area equal to 71.2 $m^2/g$ (measured according to ISO 9277) and a pH equal to 8.2 and a quantity of sodium silicate (soluble in the aqueous phase of the suspension), measured by Inductively Coupled Plasma–Optical Emission Spectroscopy (ICP-OES) equal to 190 ppm of Si.

Test No 13

This test illustrates the invention.

To do this, 1500 g, calculated as dry pigment, of natural calcium carbonate of the Norwegian marble type, with a granulometry such that 65% by weight of the particles have a diameter of less than 1 µm, measured by means of the Sedigraph™ 5100 from Micromeritics™, in the form of a suspension with 75% of dry content, dispersed with 0.6% sodium polyacrylate, is diluted until an aqueous suspension of a concentration of dry matter of 20% by weight is obtained, with distilled water, in the 10 litre container.

Then the suspension thus formed is treated at 65° C. with 150 g, calculated as dry sodium silicate, of Inosil Na 4237, Van Baerle, CH 4142 Münchenstein, Switzerland, a sodium silicate of the $SiO_2/Na_2O=3.29$ type in the form of a 30% solution of dry content, for 30 minutes. In parallel the suspension thus formed is treated at 65° C. with 10% phosphoric acid in solution at 30% by weight, at 65° C. under stirring for 30 minutes at 500 revolutions per minute.

Then the pH was adjusted to between 8 and 8.5 with a suspension of lime at a concentration of 10% by dry weight.

After 60 minutes of stirring at 500 revolutions per minute, the product was cooled to 23° C.

The mineral pigment obtained has a dry content equal to 18.9%, a BET specific surface area equal to 40.4 $m^2/g$ (measured according to ISO 9277) and a pH equal to 8.5 and a quantity of sodium silicate (soluble in the aqueous phase of the suspension), measured by Inductively Coupled Plasma—Optical Emission Spectroscopy (ICP-OES) equal to 220 ppm of Si.

EXAMPLE 2

This example illustrates the invention and concerns the use, in inkjet printing, of the pigment according to the invention as coating for the paper.

To do this, in all the tests of the example, a coating colour is prepared containing 100 parts of the pigment to be tested and 12 parts of ACRONAL™ S-360D binder from BASF with a concentration of dry matter by weight adjusted to 25%±0.5%.

Next 7 g/m of the various coating colours containing the pigment to be tested is applied to the sheets of Synteape™ paper from Arjo-Wiggins using the Erichsen Model 624 laboratory coating machine from Erichsen GmbH.KG equipped with exchangeable rolling blades.

The paper thus coated is dried for 30 minutes in an oven at 50° C. in order to obtain constant weight and humidity levels.

The printing is then carried out by means of a Hewlett-Packard Deskjet 890 C printer and an ink cartridge called Black Ink HP 45.

The reduction in the ink feathering on the coated papers according to the invention is then measured visually, along with their improved ability not to go through the paper.

Test No 14

This test illustrates the prior art and uses the pigment of 1 according to the prior art.

Appendix 8 shows the result of the printing on the paper coated with the coating colour containing the pigment of Test No 1, and constitutes the reference test.

Test No 15

This test illustrates the invention and uses the pigment of Test No 6 according to the invention.

Appendix 9 shows the result of the printing on the paper coated with the coating colour containing the pigment of Test No 6 and shows that the printing is appreciably better than that of the reference obtained with the pigment of Test No 1, namely in that it shows that the print density is greater than that of the reference, that is to say there is a reduction in ink feathering and that the ink goes through the paper less after printing.

Test No 16

This test illustrates the invention and uses the pigment of Test No 7 according to the invention.

Appendix 10 shows the result of the printing on the paper coated with the coating colour containing the pigment of Test No 7 and shows that the printing is appreciably better than that of the reference obtained with the pigment of Test No 1, namely in that it shows that the print density is greater than that of the reference, that is to say there is a reduction in ink feathering and that the ink goes through the paper less after printing.

Test No 17

This test illustrates the invention and uses the pigment of Test No 8 according to the invention.

Appendix 11 shows the result of the printing on the paper coated with the coating colour containing the pigment of Test No 8 and shows that the printing is appreciably better than that of the reference obtained with the pigment of Test No 1, namely in that it shows that the print density is greater than that of the reference, that is to say there is a reduction in ink feathering and that the ink goes through the paper less after printing.

Test No 18

This test illustrates the invention and uses the pigment of Test No 9 according to the invention.

Appendix 12 shows the result of the printing on the paper coated with the coating colour containing the pigment of Test No 9 and shows that the printing is appreciably better than that of the reference obtained with the pigment of Test No 1, namely in that it shows that the print density is greater than that of the reference, that is to say there is a reduction in ink feathering and that the ink goes through the paper less after printing.

Test No 19

This test illustrates the invention and uses the pigment of Test No 10 according to the invention.

Appendix 13 shows the result of the printing on the paper coated with the coating colour containing the pigment of Test No 10 and shows that the printing is appreciably better than that of the reference obtained with the pigment of Test No 1, namely in that it shows that the print density is greater than that of the reference, that is to say there is a reduction in ink feathering and that the ink goes through the paper less after printing.

EXAMPLE 3

This example illustrates the invention and concerns the use, in inkjet printing, of the pigment according to the invention employed as a mass filler for the paper.

To do this, the sheets of paper containing, as a filler, the suspension of the pigment to be tested are formed.

These sheets of paper thus formed are then printed by means of a Hewlett-Packard Deskjet 890 C printer and an ink cartridge called Black Ink HP 45.

There is next determined, in accordance with ISO 2469 and by means of an Elrepho™ 2000 (Datacolor) spectrophotometer, the R457 brightness measured on the reverse of the printed page and corresponding to a light radiation with a wavelength of 457 nm.

Test No 20

This test illustrates the prior art and serves as a reference.

For this purpose, the sheets of paper are produced from a cellulose pulp of degree SR 23 containing a wood sulphate pulp and fibres consisting of 80% birch and 20% pine. Then 45 g dry of this pulp is diluted in 10 litres of water along with approximately 15 dry g of the composition of fillers to be tested in order to obtain experimentally a filler content of 20% to within 0.5%. After 15 minutes of stirring and the addition of 0.06% by dry weight relative to the dry weight of paper of a retention agent of the polyacrylamide type, a sheet is formed with a weight equal to 75 g/m and filled to the extent of (20+/−0.5)%. The device used for forming the sheet is a Rapid-Köthen model 20.12 MC system from Haage.

The sheets thus formed are dried for 400 seconds at 92° C. and under a vacuum of 940 mbar. The filler content is checked by analysis of the ashes.

Once the sheet thus been formed, the thickness is measured.

The thickness of the paper or sheet of cardboard represents the perpendicular distance between the two parallel surfaces.

The samples are conditioned for 48 hours (German standard DIN EN 20187).

This standard specifies that the paper is a hygroscopic substance and, as such, has the characteristic of being capable of altering its moisture content to make it appropriate relative to that of the surrounding air. Moisture is absorbed when the ambient air undergoes an increase in humidity, and conversely is discharged when the ambient air undergoes a reduction in the humidity.

Even if the relative humidity remains at a constant level, the moisture content of the paper does not necessarily remain equal if the temperature is not kept constant within certain limits. When the moisture content increases or decreases, the physical properties of the paper are modified.

For this reason, samples must be conditioned for at least a period of 48 hours until an equilibrium is attained. The samples are also tested under identical climatic conditions.

The test climate for the paper was established such that it complies with the following data:
Relative humidity: 50% (+/−3)
Temperature: 23° C. (+/−1)
The results obtained are:
Pigment rate: 29.3% by weight
Weight of sheet of paper: 80 g/m
R 457 brightness according to the aforementioned method: 75.5%

Test No 21

This test illustrates the prior art and serves as a reference.

To do this, with the same operating method and the same equipment as in Test No 20, the sheets of paper containing, as a filler, the suspension of calcium carbonate of Test No 2 are formed.

The results obtained are:
Pigment level: 27.3% by weight
Weight of sheet of paper: 79 g/m
R 457 brightness according to the aforementioned method: 75.9%

Test No 22

This test illustrates the invention.

To do this, with the same operating method and the same equipment as in Test No 20, the sheets of paper containing, as a filler, the suspension of calcium carbonate of Test No 12 are formed.

The results obtained are:
Pigment level: 27.8% by weight
Weight of sheet of paper: 82 g/m
R 457 brightness according to the aforementioned method: 79.5%

The brightness obtained is appreciably better than that of Test No 21 of the prior art.

Test No 23

This test illustrates the invention.

To do this, with the same operating method and the same equipment as in Test No 20, the sheets of paper containing, as a filler, the suspension of calcium carbonate of Test No 13 are formed.

The results obtained are:
Pigment level: 29% by weight
Weight of sheet of paper: 81 g/m$^2$
R 457 brightness according to the aforementioned method: 77.3%

The brightness obtained is appreciably better than that of Test No 21 of the prior art.

EXAMPLE 4

This example illustrates the invention and concerns the use, in inkjet printing, of the pigment according to the invention used as a coating for the paper and as a mass filler for the paper.

Test No 24

This test illustrates the invention and uses for the coating the same operating method and the same equipment as those used in Example 2.

In a similar manner for the filling of the paper, sheets of paper containing, as a filler, the suspension of calcium carbonate of Test No 11 are formed, with the same operating method and the same equipment as those in Test No 20.

For the coating, appendix 14 shows the result of the printing of the paper coated with the coating colour containing the pigment of Test No 11 and shows that the printing is appreciably better than that of the reference obtained with the pigment of Test No 1, namely in that it shows that the print density is greater than that of the reference, that is to say there is a reduction in ink smudges and the ink goes through the paper less after printing.

The results obtained are:
R 457 brightness according to the aforementioned method: 79.3%

The brightness obtained is appreciably better than that of Test No 21 of the prior art.

The invention claimed is:

1. A product obtained by a process consisting of the steps of:
    (a) treating a natural ground calcium carbonate-containing mineral pigment, that is dispersed with a dispersing agent, in an aqueous suspension for 0.2 to 24 hours with:
        (i) phosphoric acid at a molar quantity, relative to the number of moles of calcium carbonate, of 0.05 to 1,
        (ii) gaseous $CO_2$ formed in situ and/or coming from an external supply, and
        (iii) 0.1 to 25% by dry weight, relative to the dry weight of calcium carbonate, of one or more of aluminium silicate, synthetic silica, calcium silicate, silicate of a monovalent salt, sodium aluminate and potassium aluminate,
    to obtain an aqueous suspension of mineral pigment having a pH of greater than 7.5 measured at 20° C. between one hour and twenty-four hours after treatment,
    wherein addition of the one or more of aluminium silicate, synthetic silica, calcium silicate, silicate of a monovalent salt, sodium aluminate and potassium aluminate to the aqueous suspension occurs before, during or after reaction of the surface of the natural ground calcium carbonate with the phosphoric acid; and (b) optionally adjusting the pH of the aqueous suspension of mineral pigment obtained in step (a) by the addition of a base.

2. The product according to claim 1, wherein in step (a) the mineral pigment is treated for 0.2 to 6 hours.

3. The product according to claim 1, wherein the mineral pigment is treated in part (i) with phosphoric acid at a molar quantity, relative to the number of moles of calcium carbonate, of 0.1 to 0.5.

4. The product according to claim 1, wherein the mineral pigment is treated in part (iii) with 5 to 10% by dry weight, relative to the dry weight of calcium carbonate, of one or more of aluminium silicate, synthetic silica, calcium silicate, silicate of a monovalent salt, sodium aluminate and potassium aluminate.

5. The product according to claim 1, wherein in step (a) the mineral pigment is treated at temperature of between 5° C. and 100° C.

6. The product according to claim 1, wherein in step (a) the mineral pigment is treated at temperature of between 65° C. and 90° C.

7. The product according to claim 1, wherein the mineral pigment is treated in part (iii) with a silicate of monovalent salt.

8. The product according to claim 7, wherein the silicate of monovalent salt is sodium silicate, potassium silicate, lithium silicate, and any mixture thereof.

9. The product according to claim 7, wherein the silicate of monovalent salt is sodium silicate.

10. The product according to claim 1, wherein the natural ground calcium carbonate-containing mineral pigment is treated with 0.1 to 25% by dry weight, relative to the dry weight of calcium carbonate, of aluminum silicate.

11. The product according to claim 1, wherein the mineral pigment is a mixture of natural ground calcium carbonate with one or more of talc, kaolin, titanium dioxide, or magnesium oxide.

12. The product according to claim 1, wherein the natural ground calcium carbonate-containing mineral pigment is obtained from ground marble, calcite, chalk, dolomite or any mixture thereof.

13. The product according to claim 1, wherein the mineral pigment has a BET specific surface area of 25 $m^2/g$ to 200 $m^2/g$.

14. The product according to claim 1, wherein the mineral pigment has a BET specific surface area of 30 $m^2/g$ to 80 $m^2/g$.

15. The product according to claim 1, wherein the mineral pigment has a BET specific surface area of 35 $m^2/g$ to 60 $m^2/g$.

16. The product according to claim 1, wherein the mineral pigment has a median diameter of 0.1 to 50 micrometers.

17. The product according to claim 1, wherein the mineral pigment has a median diameter of 0.5 to 40 micrometers.

18. The product according to claim 1, wherein the mineral pigment has a median diameter of 1 to 10 micrometers.

19. The product according to claim 1, wherein step (b) is performed.

20. The product according to claim 1, wherein the dispersing agent in step (a) is sodium polyacrylate.

* * * * *